Patented Jan. 13, 1942

2,270,170

UNITED STATES PATENT OFFICE 2,270,170

PROCESS FOR PREPARING TETRABROMO-INDIGO

Paul Nawiasky, Summit, and Enno Wolthuis, Cranford, N. J., assignors to General Aniline & Film Corporation, New York, N. Y., a corporation of Delaware No Drawing. Application May 20, 1940, Serial No. 336,220

8 Claims. (Cl. 260—324)

The present invention relates to a novel process for preparing tetrabromoindigo.

Up to the present time tetrabromoindigo has been prepared by treating indigo in inert solvents or in sulfuric acid with an amount of bromine which greatly exceeds the theoretical quantity of bromine necessary. One object of the present invention therefore is to make the preparation of tetrabromoindigo more economical by reducing the amount of bromine necessary for the bromination. Other objects will be seen from the specification.

We have found that tetrabromoindigo can be obtained by mixing concentrated sulfuric acid intimately with bromine and in the presence of a catalyst, preferably sodium nitrite, introducing indigo in the form of a powder. By proceeding in this manner, sulfonation of the indigo is practically prevented and the quantity of bromine used is less than nine atoms of bromine for every two molecules of indigo, that is, little more than a stochiometrical amount of bromine is required. The tetrabromoindigo obtained is equivalent in purity to the tetrabromoindigo now in use commercially and the shade as well as the dyeing and printing properties thereof are equivalent to those of the best tetrabromoindigo on the market.

The term "concentrated sulfuric acid," as used in the present specification and claims, is intended to mean sulfuric acid containing not less than about 95% $H_2SO_4$. We have found that sulfuric acid of lower concentration is not suitable for the process and prefer to use 100% $H_2SO_4$.

Catalysts suitable for the present process are alkali metal nitrites and alkaline earth metal nitrites.

The following examples will illustrate the manner in which the present invention can be carried out in practice but the invention is not restricted thereto. The parts are by weight.

Example 1

1125 parts of sulfuric acid, 100%, are cooled to 5° C. and thoroughly mixed and agitated at 5–7° C. for fifteen minutes with 7.2 parts of calcium nitrite and 60 parts bromine. 45 parts of indigo powder are then added and the mixture is stirred for five hours at a temperature of from 0–5° C. The temperature is then raised to 30° C. in the space of about one hour and held at 30° C. for sixteen hours. The products are then poured slowly into 6,000 parts of water and 2,000 parts ice. The whole is then filtered and washed nearly neutral with hot water. The press-cake is sludged with 1500 parts hot water, boiled for one-half hour and filtered. The cake is then washed neutral and dried. Tetrabromoindigo is thereby obtained with a practically theoretical yield; the product has a bromine content of 56.5%.

Example 2

900 parts of concentrated sulfuric acid are cooled to 5° C. and thoroughly mixed and agitated at 5–7° C. for fifteen minutes with 7.5 parts of sodium nitrite and 60 parts bromine. Thereafter, while stirring the mixture well at from 5–7° C., 45 parts of indigo powder are added and the mixture is stirred for five hours at a temperature of from 0–5° C. The temperature is then raised to 30° C. in the space of about one hour and held at 30° C. for sixteen hours. The products are then poured slowly into 6,000 parts of water and 2,000 parts ice. The whole is then filtered and washed nearly neutral with hot water. The press-cake is sludged with 1500 parts hot water, boiled for one-half hour and filtered. The cake is then washed neutral and dried. The product is a tetrabromoindigo which is comparable in properties to the best tetrabromoindigo in commercial use. The yield is practically theoretical; the product contains about 56–58% of bromine and no sulfur.

Instead of using 900 parts of concentrated sulfuric acid per 45 parts of indigo as described in Example 2, one may also employ 1125 parts concentrated sulfuric acid.

Similar results will be obtained by using a mixture of 900 parts of concentrated sulfuric acid, 16.3 parts 85% phosphoric acid and 100 parts 20% oleum instead of the 900 parts concentrated sulfuric acid recited in the examples. This mixture as solvent is preferable particularly when a steel kettle is used for the reaction.

The quantity of sodium nitrite may be varied within wide limits. For example, the same result is obtained if only one part sodium nitrite is used per 45 parts indigo.

We claim:

1. In the process of preparing tetrabromoindigo, the step which comprises treating indigo with a mixture of bromine and concentrated sulfuric acid, a nitrite having been added to said mixture.

2. In the process of preparing tetrabromoindigo, the step which comprises treating indigo with a mixture of bromine and concentrated sulfuric acid, a nitrite selected from the class consisting of alkali metal nitrites and alkaline earth metal nitrites having been added to said mixture.

3. In the process of preparing tetrabromoindigo, the step which comprises treating indigo with a mixture of bromine and concentrated sulfuric acid, an alkali metal nitrite having been added to said mixture.

4. In the process of preparing tetrabromoindigo, the step which comprises treating indigo with a mixture of bromine and concentrated sulfuric acid, sodium nitrite having been added to said mixture.

5. In the process of preparing tetrabromoindigo, the step which comprises treating indigo with a mixture of bromine and concentrated sulfuric acid, sodium nitrite having been added to said mixture at a temperature below about 5° C.

6. In the process of preparing tetrabromoindigo, the step which comprises treating indigo with a mixture of bromine and concentrated sulfuric acid, an alkaline earth metal nitrite having been added to said mixture.

7. In the process of preparing tetrabromoindigo, the step which comprises treating indigo with a mixture of bromine and concentrated sulfuric acid, calcium nitrite having been added to said mixture.

8. In the process of preparing tetrabromoindigo, the step which comprises treating indigo with a mixture of bromine and concentrated sulfuric acid, calcium nitrite having been added to said mixture at a temperature below about 5° C.

PAUL NAWIASKY.
ENNO WOLTHUIS.